United States Patent
Lee

(10) Patent No.: US 11,579,798 B2
(45) Date of Patent: Feb. 14, 2023

(54) MEMORY SYSTEM AND OPERATING METHOD THEREOF

(71) Applicant: SK hynix Inc., Gyeonggi-do (KR)

(72) Inventor: Joo-Young Lee, Seoul (KR)

(73) Assignee: SK hynix Inc., Gyeonggi-do (KR)

( * ) Notice: Subject to any disclaimer, the term of this patent is extended or adjusted under 35 U.S.C. 154(b) by 394 days.

(21) Appl. No.: 16/584,323

(22) Filed: Sep. 26, 2019

(65) Prior Publication Data

US 2020/0159457 A1 May 21, 2020

(30) Foreign Application Priority Data

Nov. 16, 2018 (KR) .................... 10-2018-0141586

(51) Int. Cl.
*G06F 3/06* (2006.01)

(52) U.S. Cl.
CPC .......... *G06F 3/0659* (2013.01); *G06F 3/0625* (2013.01); *G06F 3/0653* (2013.01); *G06F 3/0673* (2013.01)

(58) Field of Classification Search
CPC .... G06F 3/0625; G06F 1/3206; G06F 1/3225; G06F 3/0656; G06F 2209/548; G06F 11/3051; G06F 11/3055; G06F 3/0659; G06F 3/0653; G06F 3/0673; G06F 3/0679; G06F 3/0604; G06F 13/1668; G06F 3/0658; Y02D 10/00; G11C 16/30
See application file for complete search history.

(56) References Cited

U.S. PATENT DOCUMENTS

| 2007/0266269 | A1* | 11/2007 | Fuchikami | G06F 1/329 713/322 |
| 2015/0100744 | A1* | 4/2015 | Mirichigni | G06F 12/0246 711/154 |
| 2018/0059977 | A1* | 3/2018 | Matsuyama | G06F 3/0659 |
| 2018/0232178 | A1* | 8/2018 | Iwaki | G06F 3/0659 |
| 2019/0075159 | A1* | 3/2019 | Nakaaki | H04L 67/01 |

FOREIGN PATENT DOCUMENTS

| KR | 10-1455085 | 10/2014 |
| KR | 10-2016-0147952 | 12/2016 |

* cited by examiner

*Primary Examiner* — Jane W Benner
(74) *Attorney, Agent, or Firm* — IP & T Group LLP

(57) ABSTRACT

A method for operating a memory system including a memory device and a controller which controls the memory device includes identifying a target command among a plurality of commands queued in a host command queue; comparing an estimated power with a power limit; checking an estimated de-queuing time in the case where the estimated power is larger than or equal to the power limit; dequeuing the target command from the host command queue to a memory command queue in the case where the estimated de-queuing time is smaller than a predetermined threshold value; de-queueing the target command from the memory command queue to the memory device; and performing an operation corresponding to the target command.

20 Claims, 15 Drawing Sheets

MEMORY SYSTEM AND OPERATING METHOD THEREOF

CROSS-REFERENCE TO RELATED APPLICATION

This application claims priority under 35 U.S.C. § 119 to Korean Patent Application No. 10-2018-0141586 filed on Nov. 16, 2018, which is incorporated herein by reference in its entirety.

BACKGROUND

1. Field

Various embodiments relate to a memory system and an operating method thereof and, more particularly, to a memory system and an operating method thereof capable of improving the performance of a power management operation.

2. Discussion of the Related Art

The computer environment paradigm has shifted to ubiquitous computing, where computing systems are used anytime and anywhere. As a result, use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption, since they have no moving parts, as compared with a hard disk device. Examples of memory systems having such advantages include universal serial bus (USB) memory devices, memory cards having various interfaces, and solid state drives (SSD).

SUMMARY

Various embodiments are directed to a memory system capable of efficiently performing a power management operation by minimizing the occurrence of a situation where the system may remain pending by command queuing, and an operating method thereof.

In accordance with an embodiment of the present invention, an operating method of a memory system including a memory device and a controller which controls the memory device, the operating method includes: identifying a target command among a plurality of commands queued in a host command queue; comparing an estimated power with a power limit; checking an estimated de-queuing time in the case where the estimated power is larger than or equal to the power limit; dequeuing the target command from the host command queue to a memory command queue in the case where the estimated de-queuing time is smaller than a predetermined threshold value; de-queueing the target command from the memory command queue to the memory device; and performing an operation corresponding to the target command.

In accordance with an embodiment of the present invention, a memory system includes: a controller suitable for identifying a target command among a plurality of commands queued in a host command queue, comparing an estimated power with a power limit, checking an estimated de-queuing time in the case where the estimated power is larger than or equal to the power limit, dequeuing the target command from the host command queue to a memory command queue in the case where the estimated de-queuing time is smaller than a predetermined threshold value, and de-queueing the target command from the memory command queue to the memory device; and the memory device suitable for receiving the de-queued target command, and performing an operation corresponding to the de-queued target command.

In accordance with an embodiment of the present invention, an operating method of a controller, the operating method includes: queueing commands queued in a host command queue into a memory command queue when an estimated power is less than a first threshold or when the estimated power is the first threshold or greater and an estimated de-queuing time is less than a second threshold; performing a task when the estimated power is the first threshold or greater and the estimated de-queuing time is the second threshold or greater; and de-queueing the commands queued in the memory command queue to control a memory device to perform operations in response to the de-queued commands, wherein the estimated power is an estimated amount of power required for the memory device to perform the operations in response to all the commands currently queued in the memory command queue, and wherein the estimated de-queuing time is an estimated amount of time required for all the commands queued in the memory command queue to be de-queued.

The operating method of the memory may further include selecting at least one among tasks that do not require the memory device to consume power, in the case where the estimated de-queuing time is larger than or equal to the predetermined threshold value; and performing the selected task.

The tasks may include an operation of adjusting a sequence of the commands queued in the host command queue.

DETAILED DESCRIPTION

Figure 1:
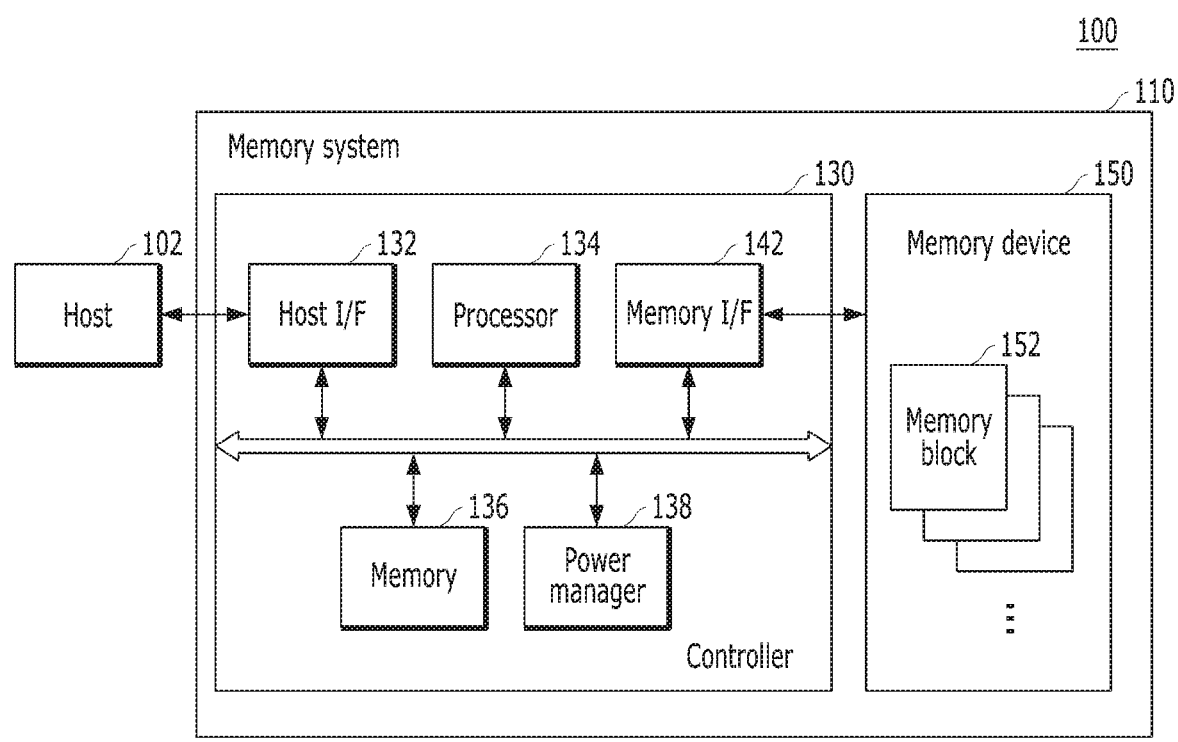
FIG. 1 is a block diagram illustrating a data processing system including a memory system in accordance with an embodiment of the present disclosure.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It is noted that reference to "an embodiment" does not necessarily mean only one embodiment, and different references to "an embodiment" are not necessarily to the same embodiment(s).

It will be understood that, although the terms "first" and/or "second" may be used herein to describe various elements, these elements should not be limited by these terms. These terms are only used to distinguish one element, from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, steps, operations, elements, components, and/or combinations of them but do not preclude the presence or addition of one or more other features, numbers, steps, operations, elements, components, and/or combinations thereof.

The above-described exemplary embodiments are merely for the purpose of understanding the technical spirit of the present disclosure and the scope of the present disclosure should not be limited to the above-described exemplary embodiments. It will be obvious to those skilled in the art to which the present disclosure pertains that other modifications based on the technical spirit of the present disclosure may be made in addition to the above-described exemplary embodiments.

Unless otherwise defined, all terms including technical and scientific terms used herein have the same meaning as commonly understood by one of ordinary skill in the art to which the present disclosure belongs. Unless otherwise defined in the present disclosure, the terms should not be construed as being ideal or excessively formal.

Hereinafter, the various embodiments of the present invention will be described in detail with reference to the attached drawings.

FIG. 1 is a block diagram illustrating a data processing system 100 including a memory system 110 in accordance with an embodiment of the present invention.

Referring to FIG. 1, the data processing system 100 may include a host 102 and the memory system 110.

The host 102 may include any of a variety of portable electronic devices such as a mobile phone, a MP3 player and a laptop computer, or any of a variety of non-portable electronic devices such as a desktop computer, a game machine, a TV and a projector.

The host 102 may include at least one OS (operating system) or a plurality of operating systems. The host 102 may execute an OS to perform an operation corresponding to a user's request on the memory system 110. Here, the host 102 may provide a plurality of commands corresponding to a user's request to the memory system 110. Thus, the memory system 110 may perform certain operations corresponding to the plurality of commands, that is, corresponding to the user's request. The OS may manage and control overall functions and operations of the host 102. The OS may support an operation between the host 102 and a user using the data processing system 100 or the memory system 110.

The memory system 110 may operate or perform a specific function or operation in response to a request from the host 102 and, particularly, may store data to be accessed by the host 102. The memory system 110 may be used as a main memory system or an auxiliary memory system of the host 102. The memory system 110 may be implemented with any one of various types of storage devices, which may be electrically coupled with the host 102, according to a protocol of a host interface. Non-limiting examples of the memory system 110 include a solid state drive (SSD), a multi-media card (MMC) and an embedded MMC (eMMC).

The memory system 110 may include various types of storage devices. Non-limiting examples of such storage devices include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM/PCRAM), a magneto-resistive RAM (MRAM), a resistive RAM (RRAM), and a flash memory.

The memory system 110 may include a memory device 150 and a controller 130.

The controller 130 and the memory device 150 may be integrated into a single semiconductor device, which may be included in any of the various types of memory systems as described above. For example, the controller 130 and the memory device 150 may be integrated as a single semiconductor device to constitute an SSD, a PCMCIA (personal computer memory card international association) card, SD card including a mini-SD, a micro-SD and a SDHC, and an UFS device. The memory system 110 may be configured as a part of a computer, a smart phone, a portable game player, or one of various components configuring a computing system.

The memory device 150 in the memory system 110 may maintain stored data even though power is not supplied. In particular, the memory device 150 in the memory system 110 stores data provided from the host 102, through a write operation, and provides stored data to the host 102, through a read operation. The memory device 150 includes a plurality of memory blocks. Each of the memory blocks includes a plurality of pages. Each of the pages includes a plurality of memory cells to which a plurality of word lines (WL) are coupled. In an embodiment, the memory device 150 may include a plurality of memory dies (not shown), and each memory die may include a plurality of planes (not shown). Each plane may include a plurality of memory blocks, each of which may include a plurality of pages, each of which may include a plurality of memory cells coupled to a word line. In an embodiment, the memory device 150 may be a flash memory having a 3-dimensional (3D) stack structure.

For the structure of the memory device 150 and the 3D stack structure of the memory device 150, detailed descriptions will be made later with reference to FIGS. 3 to 5.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations of the memory device 150.

In detail, the controller 130 includes a host interface 132, a processor 134, a memory interface 142, a memory 136 and a power manager 138.

The host interface 132 may process a command and data of the host 102, and may be configured to communicate with the host 102 through at least one among various interface protocols such as USB (universal serial bus), SATA (serial advanced technology attachment), SCSI (small computer system interface) and ESDI (enhanced small disk interface). The host interface 132 may be driven through a firmware referred to as a host interface layer (HIL) being a region which exchanges data with the host 102.

The memory interface 142 serves as a memory/storage interface which performs interfacing between the controller 130 and the memory device 150, to allow the controller 130 to control the memory device 150 in response to a request from the host 102.

Figure 2:
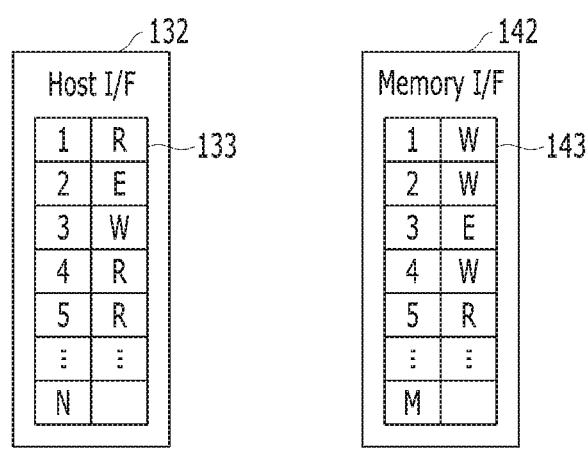
FIG. 2 is a diagram illustrating a representation of an example of command queues in accordance with the embodiment of the disclosure.

Referring to FIG. 2, each of the host interface 132 and the memory interface 142 may include a command queue. In detail, the host interface 132 may include a host command queue 133. The memory interface 142 may include a memory command queue 143.

The host interface 132 may queue a command, which is provided to the controller 130 from the host 102, in the host command queue 133. The host command queue 133 may be configured in a FIFO structure. Therefore, according to a sequence in which commands are provided from the host 102, the host interface 132 may sequentially queue the provided commands in the host command queue 133.

The host interface 132 may queue only a predetermined number N of commands in the host command queue 133. For example, in the case where 32 commands are the capacity of the host command queue 133, the host interface 132 may queue only 32 commands provided from the host 102, in the host command queue 133. When 32 commands are queued in the host command queue 133, the host 102 cannot provide an additional command to the controller 130. Only after a command queued in the host command queue 133 is de-queued, the host 102 may provide an additional command to the controller 130. That is to say, if the host command queue 133 is full of a plurality of commands, the host 102 may not perform an operation of providing a command, and may remain pending for a while.

However, it is to be noted that the above descriptions for the host command queue 133 represent nothing but a mere example and the disclosure is not limited thereto.

A command (hereinafter, referred to as a target command) corresponding to a turn to be processed among commands queued in the host command queue 133 may be queued in the memory command queue 143 by the processor 134 as will be described below. That is to say, the target command may be provided to the memory interface 142 from the host interface 132 by the processor 134.

The memory interface 142 may queue a command to be provided to the memory device 150 from the controller 130, in the memory command queue 143. Similarly to the host command queue 133, the memory command queue 143 may be configured in a FIFO structure. Therefore, according to a sequence in which commands are to be provided to the memory device 150, the memory interface 142 may queue the commands in the memory command queue 143.

The memory interface 142 may queue only a predetermined number M of commands in the memory command queue 143. The number N of commands which may be queued by the host command queue 133 and the number M of commands which may be queued by the memory command queue 143 may be different from each other. For example, in the case where 64 commands are the capacity of the memory command queue 143, the memory interface 142 may queue only 64 commands to be provided to the memory device 150, in the memory command queue 143. When 64 commands are queued in the memory command queue 143, the memory interface 142 cannot queue a command any more in the memory command queue 143. Only after at least one among commands queued in the memory command queue 143 is de-queued, the memory interface 142 may queue an additional command in the memory command queue 143. That is to say, if the memory command queue 143 is full of a plurality of commands, the memory interface 142 cannot queue a command, and may remain pending for a while.

When queuing a command in the memory command queue 143, the memory interface 142 may perform queuing based on the power situation of the memory device 150. A command may be queued in the memory command queue 143 depending on a required power corresponding to the command, in such a manner that an excessively high power is not required or consumed in the memory device 150.

However, it is to be noted that the above descriptions for the memory command queue 143 represent nothing but a mere example and the disclosure is not limited thereto.

Referring back to FIG. 1, the memory 136 as the working memory of the memory system 110 and the controller 130 stores data for driving of the memory system 110 and the controller 130.

The memory 136 may be realized by a volatile memory. For example, the memory 136 may be realized by a static random access memory (SRAM) or a dynamic random access memory (DRAM). Furthermore, the memory 136 may exist inside the controller 130. Alternatively, the memory 136 may exist outside the controller 130, and, when this is the case, may be realized as an external volatile memory to and from which data are inputted and outputted from and to the controller 130 through a memory interface.

The memory 136 stores data necessary to perform data write and read operations between the host 102 and the memory device 150 and data when performing the data write and read operations. For such data storage, the memory 136 includes a program memory, a data memory, a write buffer/cache, a read buffer/cache, a data buffer/cache, a map buffer/cache, and so forth.

The power manager 138 may provide and manage power for the memory system 110. That is to say, the power manager 138 may provide and manage power for the components included in the controller 130, and may provide and manage power for the components included in the memory device 150.

Particularly, the power manager 138 may manage estimated power, power limit and estimated de-queuing time.

The estimated power means a power required in the memory device 150 to process all commands queued in the memory command queue 143.

As described above, powers required for espective commands in the memory device 150 may be different. For example, 50 [mW] may be required for the memory device 150 to perform a read operation, 90 [mW] may be required for the memory device 150 to perform a write operation, and 70 [mW] may be required for the memory device 150 to perform an erase operation. However, it is to be noted that this is nothing but a mere example and the disclosure is not limited thereto. If three write commands, one erase command and one read command are queued in the memory command queue 143 as exemplified in FIG. 2, the estimated power may be 390 [mW] by summing 90*3, 70*1 and 50*1.

Because the estimated power is a value that varies based on the commands queued in the memory command queue 143, the power manager 138 may update the estimated power under the control of the processor 134 each time a new command is queued in or de-queued from the memory command queue 143.

The power limit means a maximum power for the memory device 150 to normally perform an operation. If the memory device 150 operates with greater power than the power limit, the memory system 110 cannot normally perform an operation. The power limit may vary according to implementation of the memory device 150.

Lastly, the estimated de-queuing time means a time for all the commands currently queued in the memory command queue 143 to be de-queued. In other words, the estimated de-queuing time means a time for all the commands currently queued in the memory command queue 143 to be provided to the memory device 150.

De-queuing times for respective commands may be different as well. For example, the de-queuing time of a write command may be 20 [us], the de-queuing time of an erase command may be 10 [us], and the de-queuing time of a read command may be 5 [us]. However, it is to be noted that this is nothing but a mere example and the disclosure is not limited thereto. If three write commands, one erase command and one read command are queued in the memory command queue 143 as exemplified in FIG. 2, the estimated de-queuing time may be 75 [us] by summing 20*3, 10*1 and 5*1.

The estimated de-queuing time may increase if a new command is queued in the memory command queue 143. The estimated de-queuing time may decrease when a command is de-queued from the memory command queue 143 to the memory device 150. A de-queueing time corresponding to a command of which de-queuing is completed may be excluded from the estimated de-queuing time.

Similarly to the estimated power, because the estimated de-queuing time is a value that varies based on the commands queued in the memory command queue 143, the power manager 138 may update the estimated de-queuing time under the control of the processor 134 each time a new command is queued in the memory command queue 143 and each time a queued command is de-queued from the memory command queue 143. In an embodiment, the power manager 138 may periodically update the estimated de-queuing time.

The processor 134 may control overall operations of the memory system 110. The processor 134 may use firmware to control the overall operations of the memory system 110. The firmware may be referred to as flash translation layer (FTL). The processor 134 may be implemented with a microprocessor or a central processing unit (CPU).

As described above, the processor 134 may control the host interface 132 and the memory interface 142 such that a command queued in the host command queue 133 is queued in the memory command queue 143.

When moving a command from the host command queue 133 to the memory command queue 143, the processor 134 may process the command by driving a firmware. In detail, the processor 134 may modify and add an information (for example, a map information) to be stored in the memory device 150 while controlling the host interface 132 and the memory interface 142 to move a command from the host command queue 133 to the memory command queue 143.

Moreover, the processor 134 may control the memory interface 142 to queue the target command in the memory command queue 143 based on the estimated power, the power limit and the estimated de-queuing time. The detailed operation of the processor 134 will be described later with reference to FIGS. 8A to 8C.

Furthermore, the processor 134 may control the memory interface 142 to provide a command queued in the memory command queue 143 to the memory device 150, and may control the memory device 150 to operate according to a command provided thereto.

While not shown in a drawing, the controller 130 may further include an error correction code (ECC) unit.

The ECC unit may correct an error bit of data processed in the memory device 150, and may include an ECC encoder and an ECC decoder.

The ECC encoder may perform error-correction encoding on data to be programmed in the memory device 150 and generate data added with parity bits. The data added with parity bits may be stored in the memory device 150. The ECC decoder detects and corrects an error included in data read from the memory device 150, when reading the data stored in the memory device 150.

The ECC unit may perform error correction by using an LDPC (low density parity check) code, a BCH (Bose, Chaudhuri, Hocquenghem) code, a turbo code, a Reed-Solomon code, a convolution code, an RSC (recursive systematic code), TCM (trellis-coded modulation) or BCM (Block coded modulation). However, it is to be noted that the disclosure is not limited thereto. The ECC unit may include all circuits, modules, systems or devices for error correction.

For example, the controller 130 may perform an operation requested by the host 102 in the memory device 150 through the processor 134, which is implemented as a microprocessor, a CPU, or the like. Also, the controller 130 may perform a background operation on the memory device 150 through the processor 134, which may be realized as a microprocessor or a CPU. The background operation performed on the memory device 150 may include an operation of copying and processing data stored in some memory blocks of the memory device 150 into other memory blocks, e.g., a garbage collection (GC) operation, an operation of performing swapping between the memory blocks or between the data of the memory blocks, e.g., a wear-leveling (WL) operation, an operation of storing the map data stored in the controller 130 in the memory blocks, e.g., a map flush operation, or an operation of managing bad blocks of the memory device 150, e.g., a bad block management operation of detecting and processing bad blocks among the memory blocks in the memory device 150.

Hereinbelow, a memory device in the memory system in accordance with the embodiment of the disclosure will be described in detail with reference to FIGS. 3 to 5.

Figure 3:
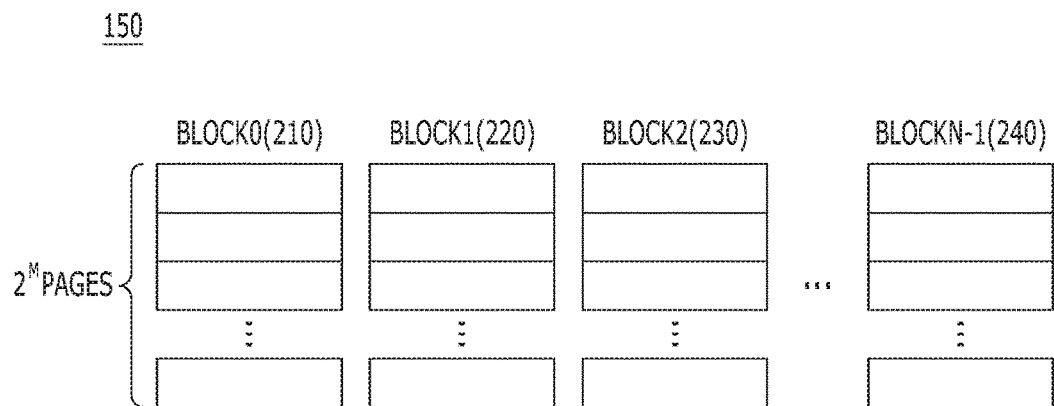
FIG. 3 is a circuit diagram illustrating a memory cell array of a memory block in the memory device shown in FIG. 1.

FIG. 3 is a schematic diagram illustrating the memory device 150. FIG. 4 is a circuit diagram illustrating an exemplary configuration of a memory cell array of a memory block 330 in the memory device 150. FIG. 5 is a schematic diagram illustrating an exemplary 3D structure of the memory device 150.

Referring to FIG. 3, the memory device 150 may include a plurality of memory blocks BLOCK0 to BLOCKN-1, where N is an integer greater than 1. Each of the blocks BLOCK0 to BLOCKN-1 may include a plurality of pages, for example, 2 m or M pages, the number of which may vary according to circuit design, M being an integer greater than 1. Each of the pages may include a plurality of memory cells that are coupled to a plurality of word lines WL.

Also, memory cells in the respective memory blocks BLOCK0 to BLOCKN-1 may be one or more of a single level cell (SLC) memory block storing 1-bit data or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells, each storing one-bit data. The SLC memory blocks may generally have higher data computing performance and higher durability than the MLC memory blocks. The MLC memory blocks may include a plurality of pages which are embodied by memory cells each storing multi-bit data (for example, 2 or more bits). The MLC memory blocks may generally have larger data storage space, that is, higher integration density, than the SLC memory blocks. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Instead of a nonvolatile memory, the memory device 150 may be implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and may transfer data stored therein to the host 102 through a read operation.

Figure 4:
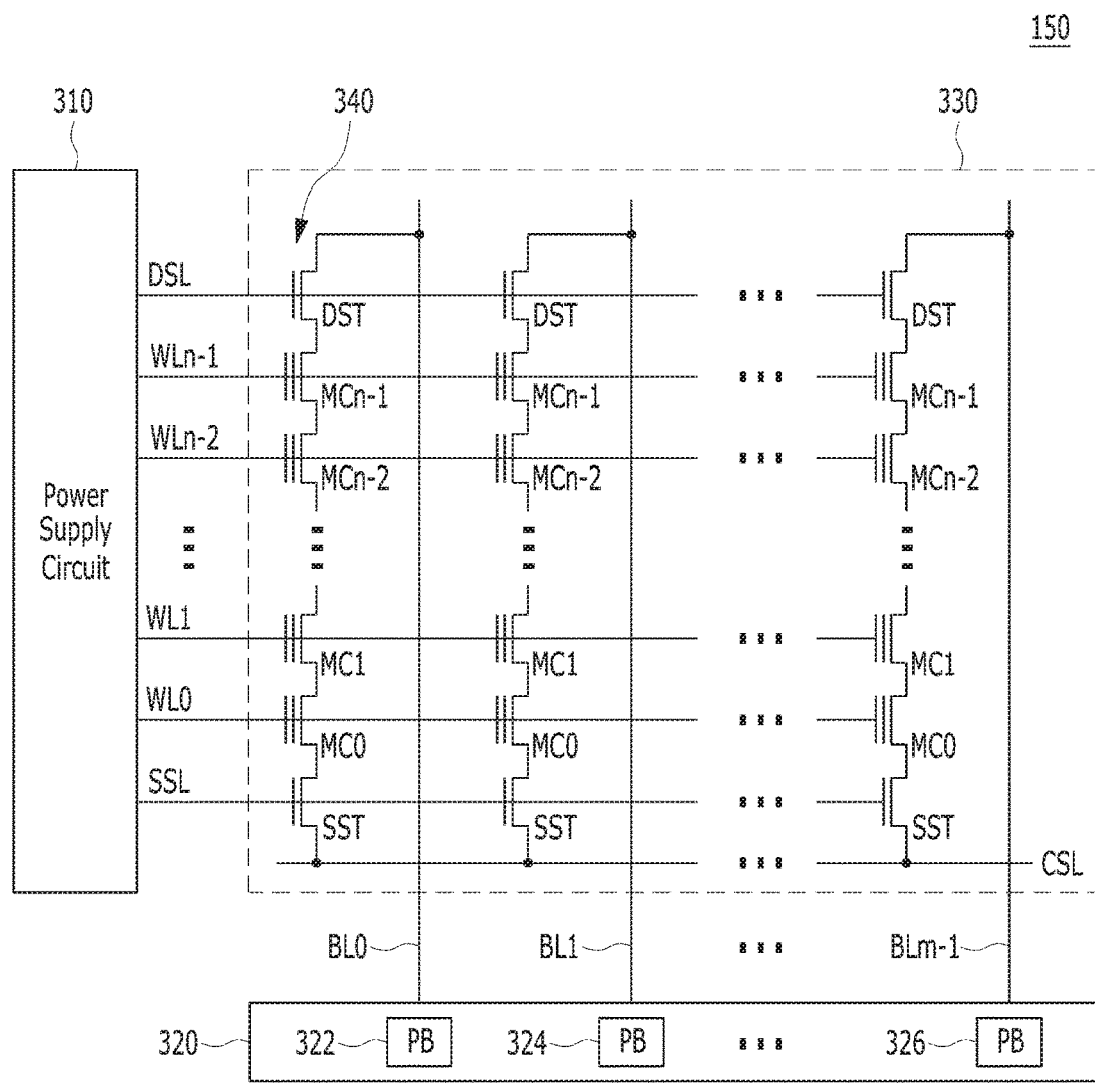
FIG. 4 is a block diagram illustrating a structure of a memory device of a memory system in accordance with an embodiment of the present invention.
Figure 5:
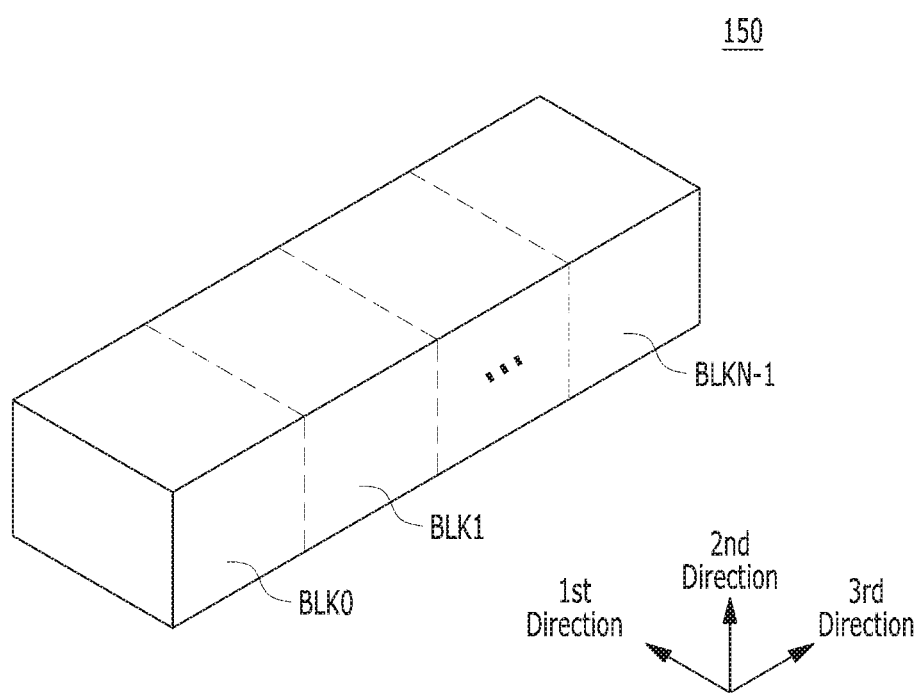
FIG. 5 is a block diagram illustrating a structure of a memory system in accordance with an embodiment of the present invention.

Next, referring to FIG. 4, among the plurality of memory blocks included in the memory device 150 of the memory system 110, each memory block 330 may include a plurality of cell strings 340 which are realized as a memory cell array and are coupled to bit lines BL0 to BLm-1, respectively. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1.

While FIG. 4 shows, as an example, each memory block 330 which is configured by NAND flash memory cells, it is to be noted that each of the plurality of memory blocks included in the memory device 150 in accordance with the embodiment of the disclosure is not limited to a NAND flash memory and may be realized by a NOR flash memory, a hybrid flash memory in which at least two types of memory cells are combined or a one-NAND flash memory in which a controller is built in a memory chip.

A power supply circuit 310 of the memory device 150 may provide word line voltages (for example, a program voltage, a read voltage and a pass voltage) to be supplied to respective word lines depending on an operation mode and a voltage to be supplied to a bulk (for example, a well region) where memory cells are formed. The voltage generating operation of the power supply circuit 310 may be performed under the control of a control circuit (not shown). The power supply circuit 310 may generate a plurality of variable read voltages to generate a plurality of read data, select one among the memory blocks (or sectors) of a memory cell array in response to the control of the control circuit, select one among the word lines of the selected memory block, and provide word line voltages to the selected word line and unselected word lines.

The memory device 150 may include a read/write circuit 320 which is controlled by the control circuit. During a verification/normal read operation, the read/write circuit 320 may operate as a sense amplifier for reading (sensing and amplifying) data from the memory cell array. During a program operation, the read/write circuit 320 may operate as a write driver for supplying a voltage or a current to bit lines according to data to be stored in the memory cell array. During a program operation, the read/write circuit 320 may receive data to be stored into the memory cell array from a buffer (not illustrated), and drive bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

Also, the memory device 150 may be realized as a two-dimensional or three-dimensional memory device. In particular, as shown in FIG. 5, the memory device 150 may be realized as a nonvolatile memory device with a three-dimensional stack structure. In the case where the memory device 150 is realized as a three-dimensional structure, the memory device 150 may include a plurality of memory blocks BLK0 to BLKN-1. FIG. 5 is a block diagram illustrating the memory blocks of the memory device 150 illustrated in FIG. 1, and each of the memory blocks may be realized as a three-dimensional structure (or a vertical structure). For example, the respective memory blocks may be realized as a three-dimensional structure by including a structure which extends in first to third directions, for example, an x-axis direction, a y-axis direction and a z-axis direction.

Each memory block 330 included in the memory device 150 may include a plurality of NAND strings NS which extend in the second direction. The plurality of NAND strings NS may be provided in the first direction and the third direction. Herein, each of the NAND strings NS may be coupled to a bit line BL, at least one string selection line SSL, at least one ground selection line GSL, a plurality of word lines WL, at least one dummy word line DWL, and a common source line CSL, and each of the NAND strings NS may include a plurality of transistor structures TS.

Namely, among the plurality of memory blocks of the memory device 150, each memory block 330 may be coupled to a plurality of bit lines BL, a plurality of string select lines SSL, a plurality of ground select lines GSL, a plurality of word lines WL, a plurality of dummy word lines DWL and a plurality of common source lines CSL, and accordingly, may include a plurality of NAND strings NS. Also, in each memory block 330, a plurality of NAND strings NS may be coupled to one bit line BL, and thereby, a plurality of transistors may be realized in one NAND string NS. The string select transistor SST of each NAND string NS may be coupled with a corresponding bit line BL, and the ground select transistor GST of each NAND string NS may be coupled with the common source line CSL. Memory cells MC may be provided between the string select transistor SST and the ground select transistor GST of each NAND string NS. Namely, in each memory block 330 of the plurality of memory blocks of the memory device 150, a plurality of memory cells may be realized.

Figure 6:
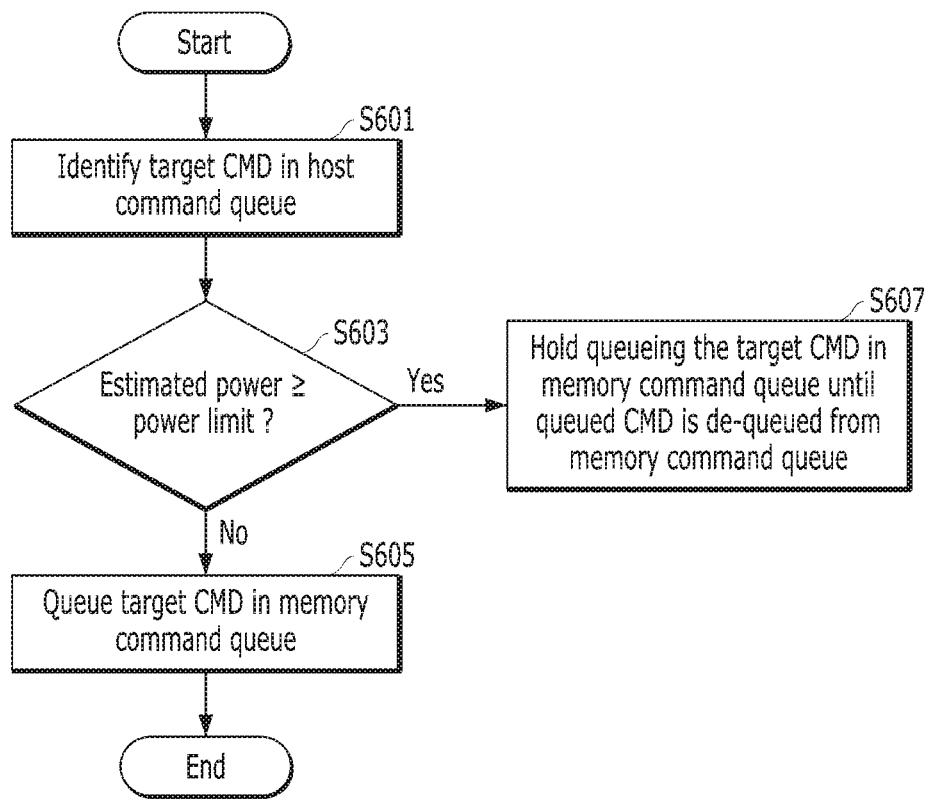
FIG. 6 is a flow chart illustrating the operation of a memory system.

FIG. 6 is a flow chart illustrating the operation of a memory system in consideration of only the power limit and the estimated power.

First, at step S601, a processor may identify a target command in a host command queue.

At step S603, the processor may compare the estimated power based on the commands queued in a memory command queue and power limit.

If the estimated power is smaller than the power limit (No at the step S603), at step S605, the processor may queue the target command in the memory command queue.

Conversely, if the estimated power is larger than or equal to the power limit (Yes at the step S603), at step S607, the processor may remain pending to queue the target command, until a command already queued in the memory command queue is processed.

Due to this fact, a concern may be raised in that, even though the processor can perform another operation, the processor remains pending to queue the target command without performing another operation.

In this regard, the memory system 110 in accordance with the embodiment of the disclosure may perform an operation of queuing a target command in the memory command queue 143 based on the estimated power, the power limit and the estimated de-queuing time.

Figure 7:
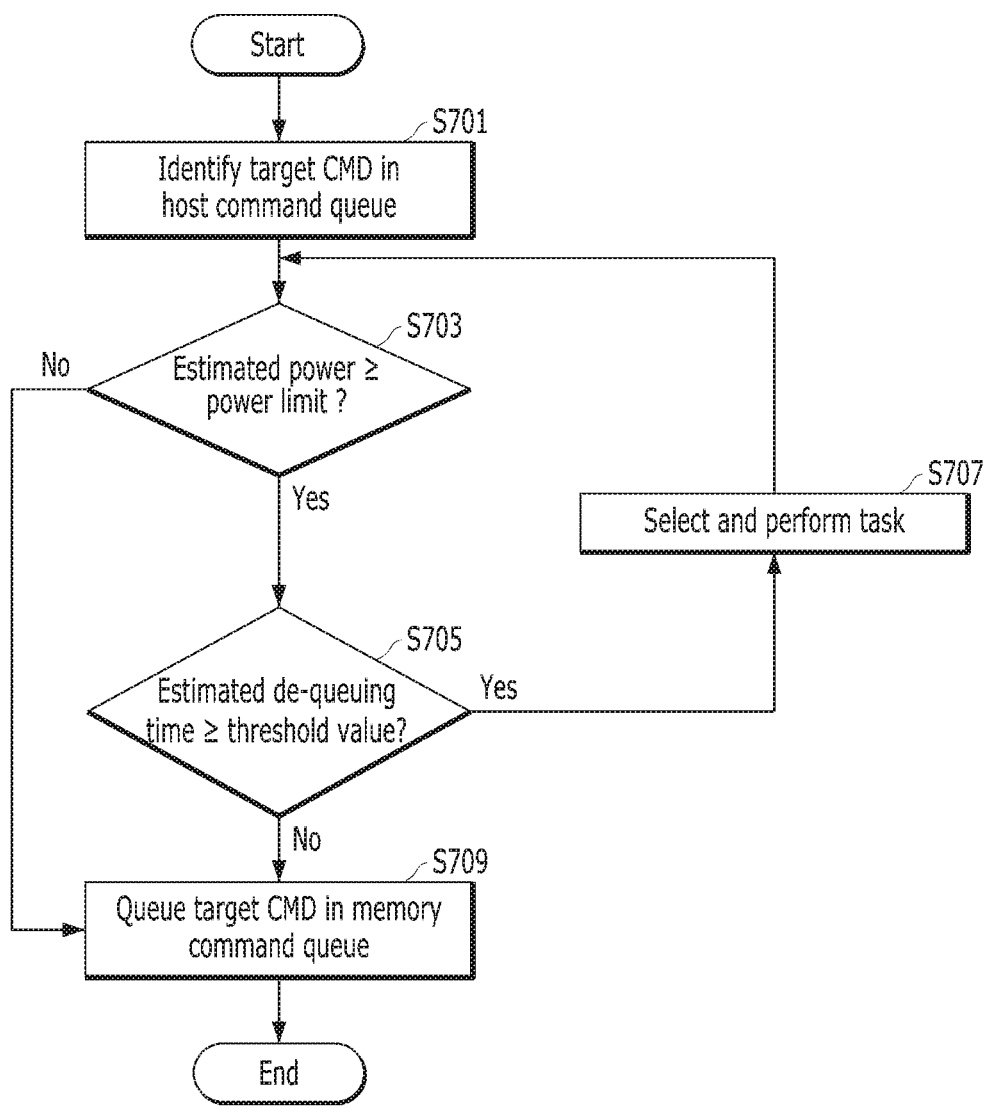
FIG. 7 is a flow chart illustrating the operation of the memory system in accordance with the embodiment of the disclosure.

FIG. 7 is a flow chart illustrating the operation of the memory system 110 in accordance with the embodiment of the disclosure.

First, at step S701, the processor 134 may identify a target command in the host command queue 133.

At step S703, the processor 134 may compare the estimated power and the power limit.

If the estimated power is smaller than the power limit (No at the step S703), at step S709, the processor 134 may queue the target command in the memory command queue 143.

Conversely, if the estimated power is larger than or equal to the power limit (Yes at the step S703), at step S705, the processor 134 may compare the estimated de-queuing time and a predetermined threshold value.

If the estimated de-queuing time is smaller than the threshold value (No at the step S705), at the step S709, the processor 134 may queue the target command in the memory command queue 143. The estimated de-queuing time smaller than the threshold value may represent that processing of at least one command among the commands currently queued in the memory command queue 143 may be completed soon. As described above with reference to step S607, the processor 134 should remain pending to queue the target command in the memory command queue 143 until a command already queued in the memory command queue 143 is processed (i.e., de-queued to the memory device 150). At this time, as the estimated de-queuing time becomes smaller than the threshold value, the processor 134 may much shortly remain pending to queue the target command in the memory command queue 143.

Conversely, if the estimated de-queuing time is larger than or equal to the threshold value (Yes at the step S705), at step S707, the processor 134 may select a task that does not require the memory device 150 to consume power and perform the selected task.

The fact that the estimated de-queuing time is larger than or equal to the threshold value means that the processor 134 should a quite long time remain pending to queue the target command in the memory command queue 143. Therefore, while the processor 134 remains pending to queue the target command, the processor 134 may perform a task other than an operation of processing the target command. Because the estimated power is larger than or equal to the power limit, the processor 134 cannot perform a task that requires the memory device 150 to consume power. Thus, the processor 134 may select and perform a task that does not require the memory device 150 to consume power. For example, the processor 134 may select and perform a task that does not increase the estimated power, such as an operation of adjusting the sequence of the commands queued in the host command queue 133 or an operation of processing the commands.

In particular, the processor 134 may select a task based on the de-queuing time of a command which is currently being de-queued from the memory command queue 143 to the memory device 150. As described above with reference to FIG. 2, the power manager 138 may estimate the de-queuing time of the command based on the type of the command. If the de-queuing time of a command which is currently being de-queued to the memory device 150 is relatively long, the processor 134 may select a task that requires a relatively long time. Conversely, if the de-queuing time of a command which is currently being de-queued to the memory device 150 is relatively short, the processor 134 may select a task that requires a relatively short time. Therefore, the processor 134 may identify a task to be performed, depending on the de-queuing time of a command which is currently being de-queued to the memory device 150. For example, in the case where the de-queuing time of a command which is currently being de-queued to the memory device 150 is shorter than 10 [us], the processor 134 may perform an operation of adjusting the sequence of the commands queued in the host command queue 133. Conversely, in the case where the de-queuing time is longer than or equal to 10 [us], the processor 134 may perform an operation of processing the commands queued in the host command queue 133, for smooth processing. However, it is to be noted that this is nothing but a mere example and the disclosure is not limited thereto.

After completely performing the task, the processor 134 may perform an operation again from the step S703.

Figure 8A:
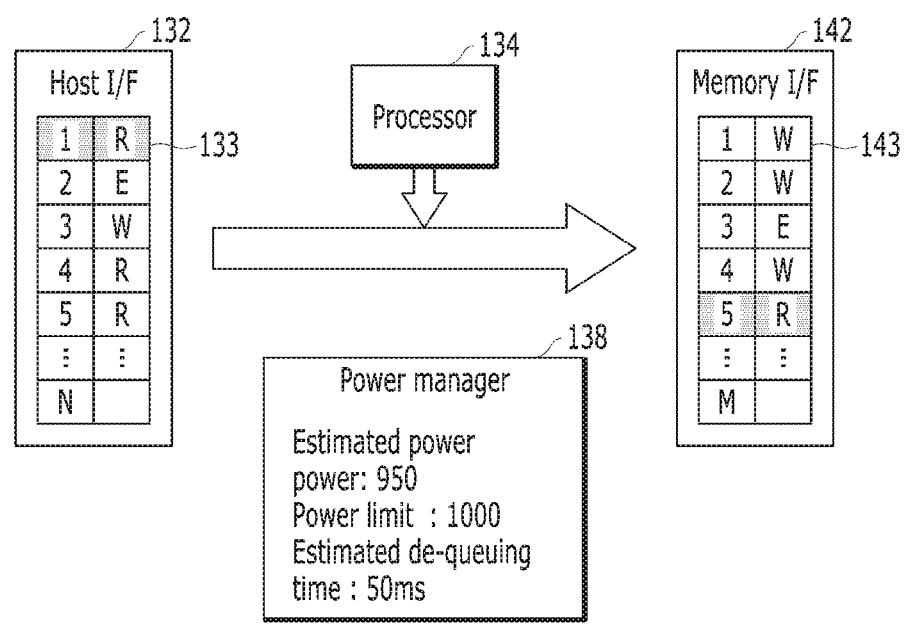
FIGS. 8A to 8C are conceptual diagrams illustrating the operation of the memory system in accordance with the embodiment of the disclosure.
Figure 8B:
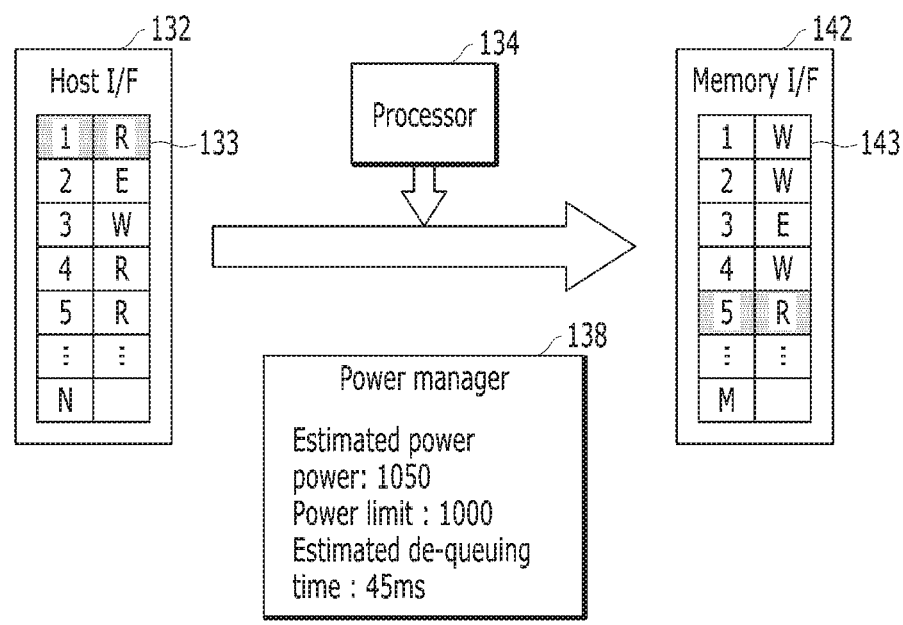
Figure 8C:
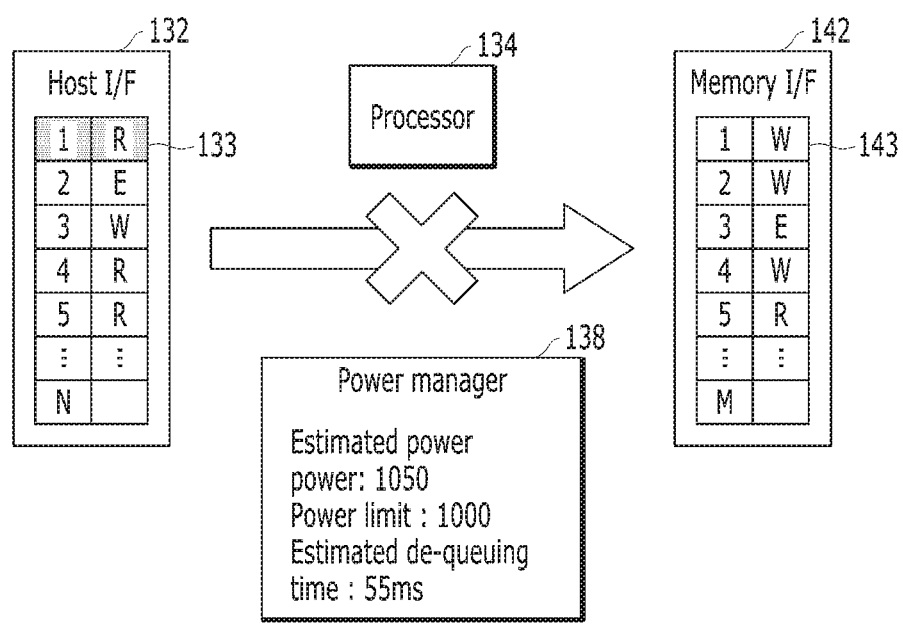

FIGS. 8A to 8C are representations of examples of conceptual diagrams to assist in the explanation of the operation of the memory system 110 in accordance with the embodiment of the disclosure. In the following descriptions, it is assumed for the sake of convenience in explanation that the power limit is 1000 [mW] and a threshold value to be compared with the estimated de-queuing time is 50 [ms]. Further, it is assumed that the memory command queue 143 is not full of commands.

First, referring to FIG. 8A, the processor 134 may identify a read command (a shaded portion) queued in the host command queue 133, as a target command.

The processor 134 may check that the estimated power stored in the power manager 138 is 950 [mW]. The processor 134 may compare the estimated power and the power limit.

Since the estimated power is smaller than the power limit, the processor 134 may control the host interface 132 and the memory interface 142 to queue the target command in the memory command queue 143 regardless of estimated de-queuing time.

Referring to FIG. 8B, the processor 134 may identify a read command (a shaded portion) queued in the host command queue 133, as a target command.

The processor 134 may check that the estimated power stored in the power manager 138 is 1050 [mW]. The processor 134 may compare the estimated power and the power limit.

Since the estimated power is larger than the power limit, the processor 134 may compare estimated de-queuing time and the predetermined threshold value.

Since the estimated de-queuing time is 45 [ms] which is smaller than the predetermined threshold value, the processor 134 may control the host interface 132 and the memory interface 142 to queue the target command in the memory command queue 143.

Referring to FIG. 8C, the processor 134 may identify a read command (a shaded portion) queued in the host command queue 133, as a target command.

The processor 134 may check that the estimated power stored in the power manager 138 is 1050 [mW]. The processor 134 may compare the estimated power and the power limit.

Since the estimated power is larger than the power limit, the processor 134 may compare estimated de-queuing time and the predetermined threshold value.

Since the estimated de-queuing time is 55 [ms] which is larger than the predetermined threshold value, the processor 134 may not queue the target command in the memory command queue 143 and may select and perform another task. The processor 134 may select and perform a task based on the de-queuing time of a command which is currently being de-queued from the memory command queue 134 to the memory device 150. After the task is completely performed, the processor 134 may process again the target command.

Figure 9:
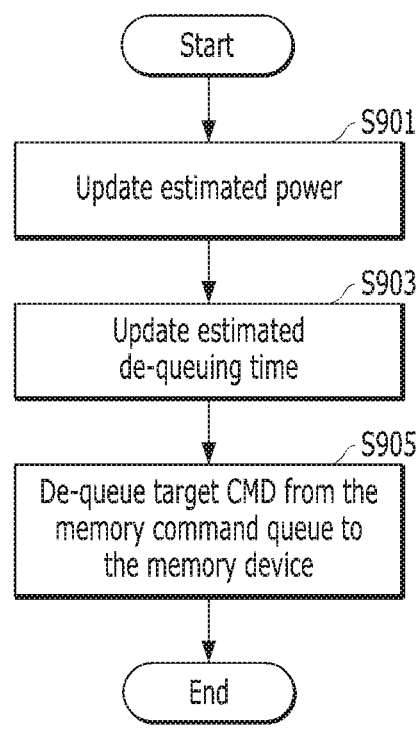
FIG. 9 is a flow chart illustrating the operation of the memory system in accordance with the embodiment of the disclosure.

FIG. 9 is a flow chart illustrating the operation of the memory system 110 in accordance with the embodiment of the disclosure. Particularly, FIG. 9 shows the operation of the memory system 110 that is performed after the operation of the step S709 shown in FIG. 7. Hereinbelow, for the sake of convenience in explanation, the operation of the memory system 110 will be described by considering only the target command among the plurality of commands queued in the memory command queue 143.

First, at step S901, the processor 134 may control the power manager 138 to update the estimated power to reflect a required power corresponding to the target command queued in the memory command queue 143.

At step S903, the processor 134 may control the power manager 138 to update the estimated de-queuing time to reflect a de-queuing time corresponding to the target command queued in the memory command queue 143.

Although update operations are divisionally shown as the step S901 and the step S903 in FIG. 9, it is to be noted that the update operations may be performed substantially simultaneously.

Then, at step S905, when it is a turn to process the target command, the processor 134 may control the memory interface 142 to de-queue the target command from the memory command queue 143 to the memory device 150.

Figure 10:
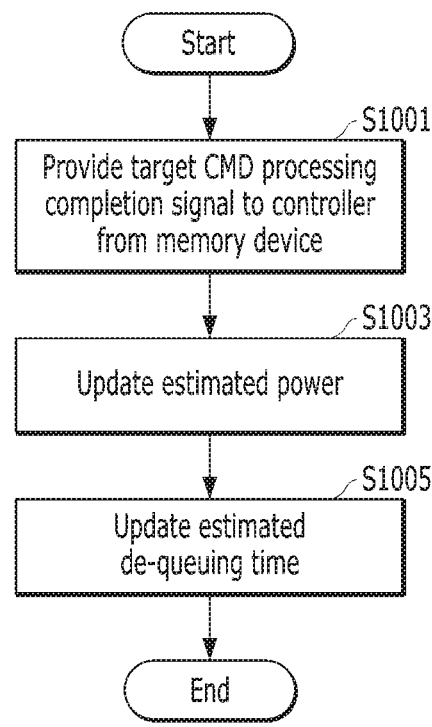
FIG. 10 is a flow chart illustrating the memory system in accordance with the embodiment of the disclosure.

FIG. 10 is a flow chart illustrating the operation of the memory system 110 in accordance with the embodiment of the disclosure. Particularly, FIG. 10 shows the operation of the memory system 110 after the target command is completely processed. Hereinbelow, for the sake of convenience in explanation, the operation of the memory system 110 will be described by considering only the target command.

First, after the target command is completely processed, at step S1001, the memory device 150 may provide a processing completion signal to the controller 130.

At step S1003, the processor 134 may control the power manager 138 to update the estimated power to reflect (i.e., exclude) a required power corresponding to the process-completed target command.

At step S1005, the processor 134 may control the power manager 138 to update the estimated de-queuing time to reflect (i.e., exclude) a de-queuing time corresponding to the process-completed target command.

Although update operations are divisionally shown as the step S1003 and the step S1005 in FIG. 10, it is to be noted that the update operations may be performed substantially simultaneously. Also, as a matter of course, a time at which the estimated de-queuing time is updated may be set differently. For example, the estimated de-queuing time may be periodically updated.

As is apparent from the above descriptions, in the memory system 110 in accordance with the embodiment of the disclosure, since a command queuing operation is performed on the basis of the estimated de-queuing time in addition to the power limit and the estimated power, a time through which the memory system 110 remains pending may be minimized, whereby the performance of the memory system 110 may be improved.

Hereinbelow, detailed descriptions will be made with reference to FIGS. 11 to 19, for a data processing system and electronic appliances to which the memory system 110 including the memory device 150 and the controller 130 described above with reference to FIGS. 1 to 10, in accordance with the embodiment of the disclosure, is applied.

Figure 11:
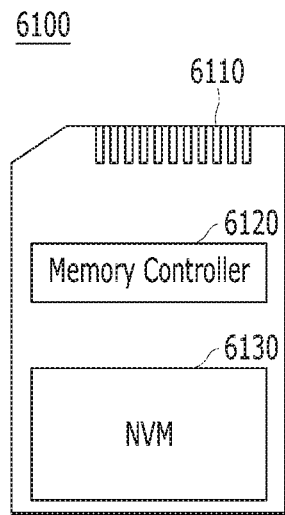
FIGS. 11 to 19 are diagrams illustrating exemplary applications of a data processing system in accordance with various embodiments of the present invention.

FIG. 11 is a diagram illustrating another example of a data processing system including a memory system in accordance with an embodiment. For example, FIG. 11 illustrates a memory card system 6100 to which the memory system may be applied.

Referring to FIG. 11, the memory card system 6100 may include a memory controller 6120, a memory device 6130 and a connector 6110.

More specifically, the memory controller 6120 may be electrically connected to, and configured to access, the memory device 6130 embodied by a nonvolatile memory (NVM). For example, the memory controller 6120 may be configured to control read, write, erase and background operations of the memory device 6130. The memory controller 6120 may be configured to provide an interface between the memory device 6130 and a host, and to use firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a random access memory (RAM), a processor, a host interface, a memory interface and an error correction component.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), advanced technology attachment (ATA), serial-ATA, parallel-ATA, small computer system interface (SCSI), enhanced small disk interface (EDSI), integrated drive electronics (IDE), Firewire, universal flash storage (UFS), wireless fidelity (Wi-Fi or WiFi) and Bluetooth. Thus, the memory system and the data processing system in accordance with the present embodiment may be applied to wired/wireless electronic devices or specific mobile electronic devices.

The memory device 6130 may be implemented by a nonvolatile memory (NVM). For example, the memory device 6130 may be implemented by any of various nonvolatile memory devices such as an erasable and programmable ROM (EPROM), an electrically erasable and programmable ROM (EEPROM), a NAND flash memory, a NOR flash memory, a phase-change RAM (PRAM/PCRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device to form a solid-state driver (SSD). Also, the memory controller 6120 and the memory device 6130 may be so integrated to form a memory card such as a PC card (personal computer memory card international association (PCMCIA)), a compact flash (CF) card, a smart media card (e.g., a SM and a SMC), a memory stick, a multimedia card (e.g., a MMC, a RS-MMC, a MMCmicro and an eMMC), a secure digital (SD) card (e.g., a SD, a miniSD, a microSD and a SDHC), and/or a universal flash storage (UFS).

Figure 12:
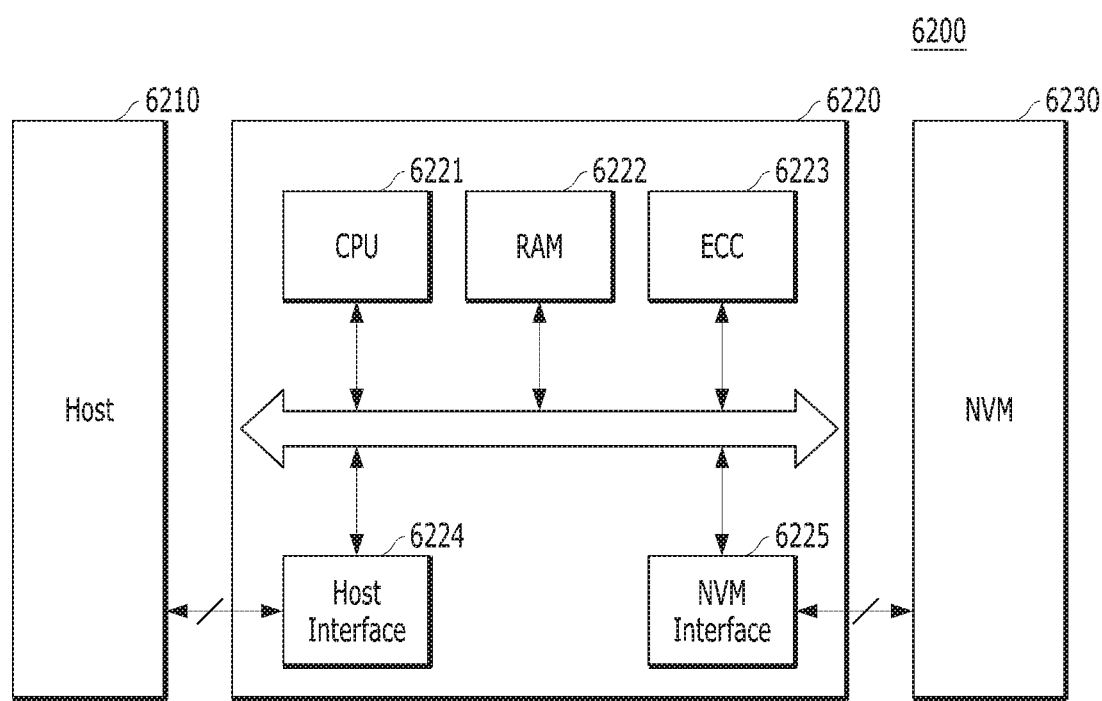

FIG. 12 is a diagram illustrating another example of a data processing system 6200 including a memory system in accordance with an embodiment.

Referring to FIG. 12, the data processing system 6200 may include a memory device 6230 having one or more nonvolatile memories (NVMs) and a memory controller 6220 for controlling the memory device 6230. The data processing system 6200 illustrated in FIG. 12 may serve as a storage medium such as a memory card (e.g., CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210. The memory controller 6220 may include one or more central processing units (CPUs) 6221, a buffer memory such as a random access memory (RAM) 6222, an error correction code (ECC) circuit 6223, a host interface 6224 and a memory interface such as a nonvolatile memory (NVM) interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or vice versa. When the RAM 6222 is used as a cache memory, the RAM 6222 may assist the low-speed memory device 6230 to operate at high speed.

The ECC circuit 6223 may generate an error correction code (ECC) for correcting a failed bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. The ECC circuit 6223 may correct an error using the parity bit. The ECC circuit 6223 may correct an error using the low density parity check (LDPC) code, Bose-Chaudhri-Hocquenghem (BCH) code, turbo code, Reed-Solomon (RS) code, convolution code, recursive systematic code (RSC) or coded modulation such as trellis coded modulation (TCM) or block coded modulation (BCM).

The memory controller 6220 may transmit/receive data to/from the host 6210 through the host interface 6224. The memory controller 6220 may transmit/receive data to/from the memory device 6230 through the NVM interface 6225. The host interface 6224 may be connected to the host 6210 through a parallel advanced technology attachment (DATA) bus, a serial advanced technology attachment (SATA) bus, a small computer system interface (SCSI), a universal serial bus (USB), a peripheral component interconnect-express (PCIe) or a NAND interface. The memory controller 6220 may have a wireless communication function with a mobile communication protocol such as wireless fidelity (WiFi) or long term evolution (LTE). The memory controller 6220 may be connected to an external device, for example, the host 6210 or another external device, and then transmit/receive data to/from the external device. In particular, as the memory controller 6220 is configured to communicate with the external device according to one or more of various communication protocols, the memory system and the data processing system in accordance with an embodiment may be applied to wired/wireless electronic devices, particularly a mobile electronic device.

Figure 13:
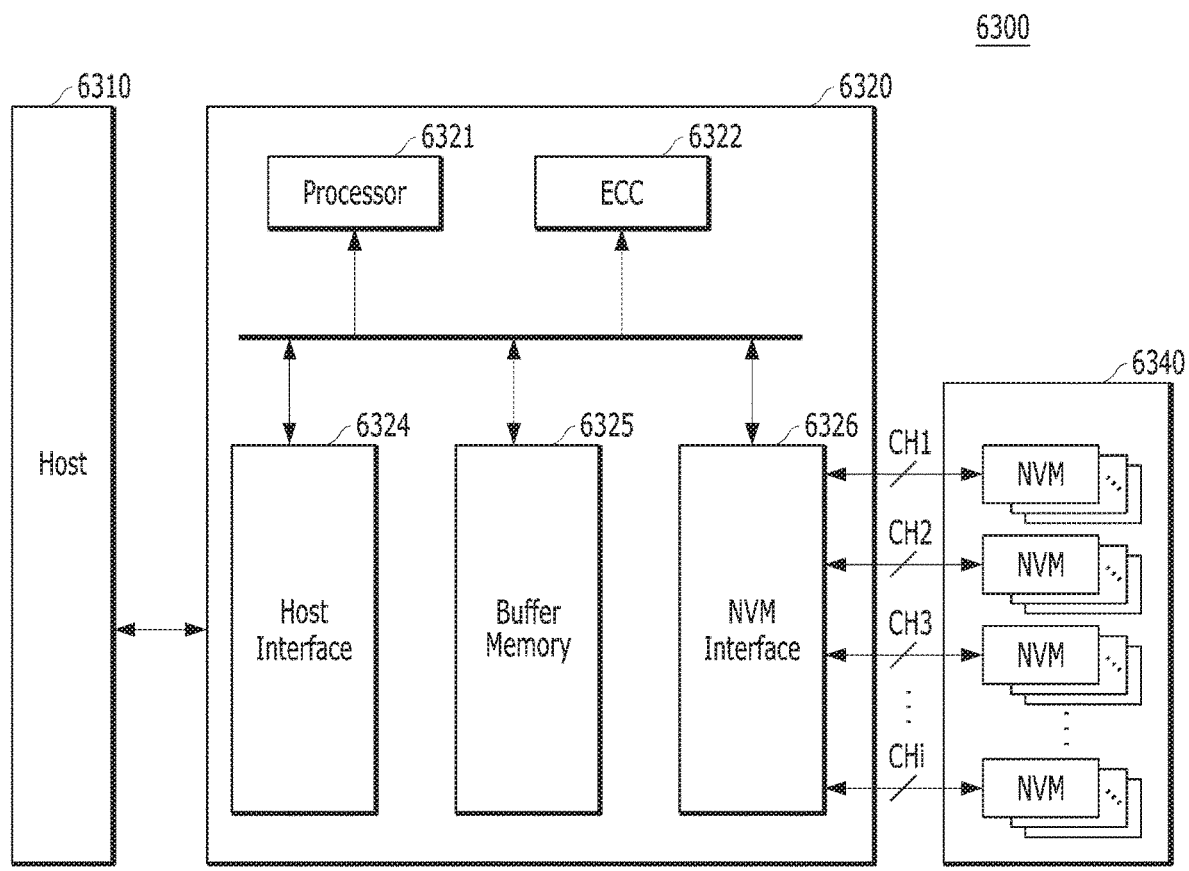

FIG. 13 is a diagram illustrating another example of a data processing system including a memory system in accordance with an embodiment. For example, FIG. 13 illustrates a solid state drive (SSD) 6300 to which the memory system may be applied.

Referring to FIG. 13, the SSD 6300 may include a controller 6320 and a memory device 6340 including a plurality of nonvolatile memories (NVMs). The controller 6320 may correspond to the controller 130 in the memory system 110 of FIG. 1, and the memory device 6340 may correspond to the memory device 150 in the memory system of FIG. 1.

More specifically, the controller 6320 may be connected to the memory device 6340 through a plurality of channels CH1 to CHi. The controller 6320 may include one or more processors 6321, an error correction code (ECC) circuit 6322, a host interface 6324, a buffer memory 6325 and a memory interface, for example, a nonvolatile memory interface 6326.

The buffer memory 6325 may temporarily store data provided from the host 6310 or data provided from a plurality of flash memories NVM included in the memory device 6340. Further, the buffer memory 6325 may temporarily store meta data of the plurality of flash memories NVM, for example, map data including a mapping table. The buffer memory 6325 may be embodied by any of a variety of volatile memories such as a dynamic random access memory (DRAM), a synchronous DRAM (SDRAM), a double data rate (DDR) SDRAM, a low power DDR (LPDDR) SDRAM and a graphics RAM (GRAM) or nonvolatile memories such as a ferroelectric RAM (FRAM), a resistive RAM (RRAM or ReRAM), a spin-transfer torque magnetic RAM (STT-MRAM) and a phase-change RAM (PRAM/PCRAM). FIG. 13 illustrates that the buffer memory 6325 is embodied in the controller 6320. However, the buffer memory 6325 may be external to the controller 6320.

The ECC circuit 6322 may calculate an error correction code (ECC) value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 may be applied may be provided to embody a data processing system, for example, a redundant array of independent disks (RAID) system. The RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data corresponding to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 14:
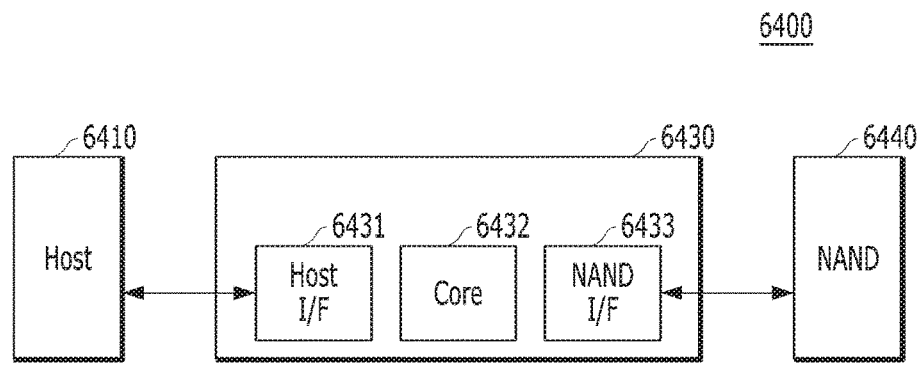

FIG. 14 is a diagram illustrating another example of a data processing system including a memory system in accordance with an embodiment. For example, FIG. 14 illustrates an embedded multi-media card (eMMC) 6400 to which the memory system may be applied.

Referring to FIG. 14, the eMMC 6400 may include a controller 6430 and a memory device 6440 embodied by one or more NAND flash memories. The controller 6430 may correspond to the controller 130 in the memory system 110 of FIG. 1. The memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, ultra high speed (UHS)-I/UHS-II) interface.

FIGS. 15 to 18 are diagrams illustrating other examples of a data processing system including a memory system in accordance with embodiments. For example, FIGS. 15 to 18 illustrate universal flash storage (UFS) systems to which the memory system may be applied.

Referring to FIGS. 15 to 18, the UFS systems 6500, 6600, 6700, 6800 may include hosts 6510, 6610, 6710, 6810, UFS devices 6520, 6620, 6720, 6820 and UFS cards 6530, 6630, 6730, 6830, respectively. The hosts 6510, 6610, 6710, 6810 may serve as application processors of wired/wireless electronic devices or particularly mobile electronic devices, the UFS devices 6520, 6620, 6720, 6820 may serve as embedded UFS devices, and the UFS cards 6530, 6630, 6730, 6830 may serve as external embedded UFS devices or removable UFS cards.

The hosts 6510, 6610, 6710, 6810, the UFS devices 6520, 6620, 6720, 6820 and the UFS cards 6530, 6630, 6730, 6830 in the respective UFS systems 6500, 6600, 6700, 6800 may communicate with external devices, for example, wired/wireless electronic devices or particularly mobile electronic devices through UFS protocols, and the UFS devices 6520, 6620, 6720, 6820 and the UFS cards 6530, 6630, 6730, 6830 may be embodied by the memory system 110 illustrated in FIG. 1. For example, in the UFS systems 6500, 6600, 6700, 6800, the UFS devices 6520, 6620, 6720, 6820 may be embodied in the form of the data processing system 6200, the SSD 6300 or the eMMC 6400 described with reference to FIGS. 12 to 14, and the UFS cards 6530, 6630, 6730, 6830 may be embodied in the form of the memory card system 6100 described with reference to FIG. 11.

Furthermore, in the UFS systems 6500, 6600, 6700, 6800, the hosts 6510, 6610, 6710, 6810, the UFS devices 6520, 6620, 6720, 6820 and the UFS cards 6530, 6630, 6730, 6830 may communicate with each other through an UFS interface, for example, MIPI M-PHY and MIPI unified protocol (UniPro) in mobile industry processor interface (MIPI). Furthermore, the UFS devices 6520, 6620, 6720, 6820 and the UFS cards 6530, 6630, 6730, 6830 may communicate with each other through any of various protocols other than the UFS protocol, for example, universal storage bus (USB) Flash Drives (UFDs), a multi-media card (MMC), a secure digital (SD), a mini-SD, and a micro-SD.

Figure 15:
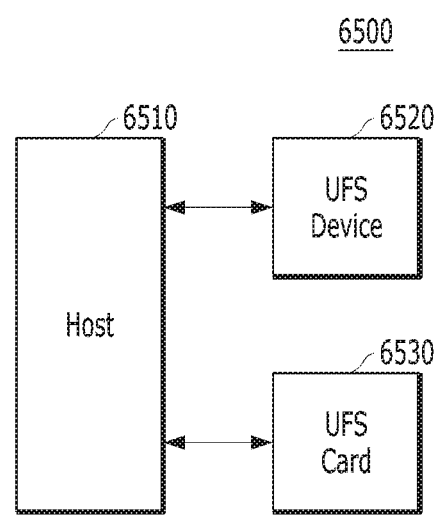

In the UFS system 6500 illustrated in FIG. 15, each of the host 6510, the UFS device 6520 and the UFS card 6530 may include UniPro. The host 6510 may perform a switching operation to communicate with the UFS device 6520 and the UFS card 6530. In particular, the host 6510 may communicate with the UFS device 6520 or the UFS card 6530 through link layer switching, for example, L3 switching at the UniPro. The UFS device 6520 and the UFS card 6530 may communicate with each other through link layer switching at the UniPro of the host 6510. In the illustrated embodiment, one UFS device 6520 and one UFS card 6530 are connected to the host 6510. However, a plurality of UFS devices and UFS cards may be connected in parallel or in the form of a star to the host 6410. A star formation is an arrangement in which a single device is coupled with plural devices for centralized operation. A plurality of UFS cards may be connected in parallel or in the form of a star to the UFS device 6520 or connected in series or in the form of a chain to the UFS device 6520.

Figure 16:
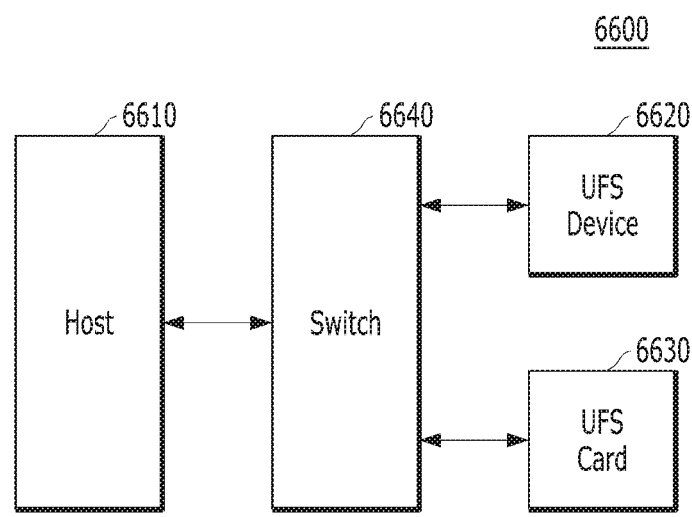

In the UFS system 6600 illustrated in FIG. 16, each of the host 6610, the UFS device 6620 and the UFS card 6630 may include UniPro. The host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the illustrated embodiment, one UFS device 6620 and one UFS card 6630 are connected to the switching module 6640. However, a plurality of UFS devices and UFS cards may be connected in parallel or in the form of a star to the switching module 6640. A plurality of UFS cards may be connected in series or in the form of a chain to the UFS device 6620.

Figure 17:
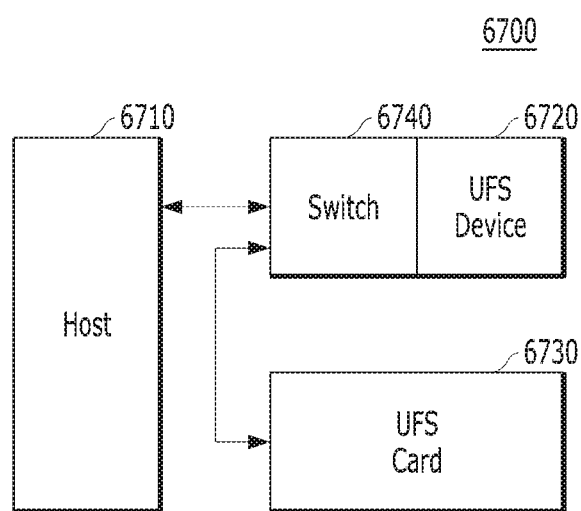

In the UFS system 6700 illustrated in FIG. 17, each of the host 6710, the UFS device 6720 and the UFS card 6730 may include UniPro. The host 6710 may communicate with the UFS device 6720 or the UFS card 6730 through a switching module 6740 performing a switching operation, for example, through the switching module 6740 which performs link layer switching at the UniPro, for example, L3 switching. The UFS device 6720 and the UFS card 6730 may communicate with each other through link layer switching of the switching module 6740 at the UniPro. The switching module 6740 may be integrated as one module with the UFS device 6720 inside or outside the UFS device 6720. In the illustrated embodiment, one UFS device 6720 and one UFS card 6730 are connected to the switching module 6740. However, a plurality of modules, each including the switching module 6740 and the UFS device 6720, may be connected in parallel or in the form of a star to the host 6710. In another example, a plurality of modules may be connected in series or in the form of a chain to each other. Furthermore, a plurality of UFS cards may be connected in parallel or in the form of a star to the UFS device 6720.

Figure 18:
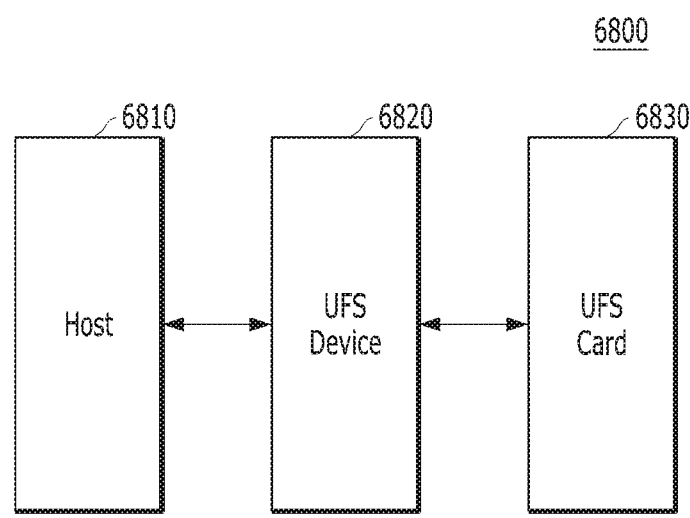

In the UFS system 6800 illustrated in FIG. 18, each of the host 6810, the UFS device 6820 and the UFS card 6830 may include M-PHY and UniPro. The UFS device 6820 may perform a switching operation to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target identifier (ID) switching operation. The host 6810 and the UFS card 6830 may communicate with each other through target ID switching between the M-PHY and UniPro modules of the UFS device 6820. In the illustrated embodiment, one UFS device 6820 is connected to the host 6810 and one UFS card 6830 is connected to the UFS device 6820. However, a plurality of UFS devices may be connected in parallel or in the form of a star to the host 6810, or connected in series or in the form of a chain to the host 6810. A plurality of UFS cards may be connected in parallel or in the form of a star to the UFS device 6820, or connected in series or in the form of a chain to the UFS device 6820.

Figure 19:
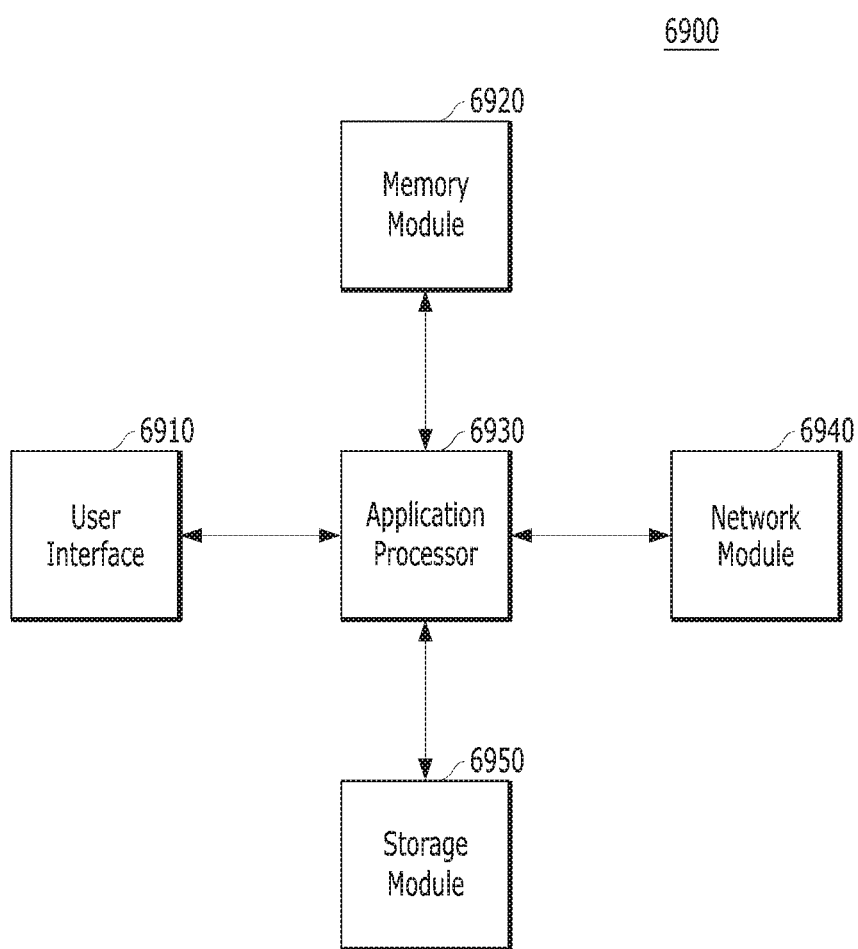

FIG. 19 is a diagram illustrating another example of a data processing system including a memory system in accordance with an embodiment of the present invention. For example, FIG. 19 is a diagram illustrating a user system 6900 to which the memory system may be applied.

Referring to FIG. 19, the user system 6900 may include a user interface 6910, a memory module 6920, an application processor 6930, a network module 6940 and a storage module 6950.

More specifically, the application processor 6930 may drive components in the user system 6900, for example, an operating system (OS), and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile random access memory (RAM) such as a dynamic RAM (DRAM), a synchronous DRAM (SDRAM), a double data rate (DDR) SDRAM, a DDR2 SDRAM, a DDR3 SDRAM, a low power DDR (LPDDR) SDARM, a LPDDR3 SDRAM or a LPDDR3 SDRAM or a nonvolatile RAM such as a phase-change RAM (PRAM/PCRAM), a resistive RAM (ReRAM), a magneto-resistive RAM (MRAM) or a ferroelectric RAM (FRAM). For example, the application processor 6930 and the memory module 6920 may be packaged and mounted, based on package on package (PoP).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (WiMAX), wireless local area network (WLAN), ultra-wideband (UWB), Bluetooth, wireless display (WI-DI), thereby communicating with wired/wireless electronic devices, particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data received from the application processor 6930, and then may transmit the stored data to the application processor 6930. The storage module 6950 may be embodied by a nonvolatile semiconductor memory device such as a phase-change RAM (PRAM/PCRAM), a magnetic RAM (MRAM), a resistive RAM (ReRAM), a NAND flash, a NOR flash and a 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, an eMMC and an UFS as described above with reference to FIGS. 13 to 18.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments, the memory system may efficiently manage power, thereby improving the performance.

While the present invention has been described with respect to the specific embodiments, it will be apparent to those skilled in the art that various changes and modifications may be made without departing from the spirit and scope of the invention as defined in the following claims.

What is claimed is:

1. A method for operating a memory system including a memory device and a controller which controls the memory device, the method comprising:
   queuing a plurality of commands input from an external device in a host command queue;
   identifying a target command among a plurality of commands queued in the host command queue;
   controlling a transmission of the target command from the host command queue to a memory command queue based on an estimated power consumption of the memory device;
   controlling the transmission of the target command from the host command queue to the memory command queue based on an estimated de-queuing time of the memory command queue; and
   performing an operation corresponding to the target command.

2. The method according to claim 1, wherein the controlling the transmission includes:
   comparing an estimated power of the memory device with a power limit; and
   transmitting the target command from the host command queue to the memory command queue in response to the estimated power being smaller than the power limit.

3. The method according to claim 2, wherein the checking the estimated de-queuing time includes:
   transmitting the target command from the host command queue to the memory command queue in response to the estimated power being larger than or equal to the power limit and the estimated de-queuing time smaller than a predetermined threshold value; and
   deferring the transmitting the target command from the host command queue to the memory command queue in response to the estimated power being larger than or equal to the power limit and the estimated de-queuing time is-larger than or equal to the predetermined threshold value.

4. The method according to claim 3, wherein the deferring the transmitting the target command in the fourth case includes:
   selecting at least one among tasks that do not require the memory device to consume power; and
   performing the at least one selected task,
   wherein the selecting selects at least one task based on de-queuing time of a command which is being de-queued from the memory command queue to the memory device.

5. The method according to claim 2, further comprising updating the estimated power and the estimated de-queuing time.

6. The method according to claim 1, wherein the target command is de-queued to the memory device when it is a turn to process the target command among a plurality of commands queued in the memory command queue.

7. The method according to claim 6, further comprising providing a processing completion signal for the target command, to the controller from the memory device.

8. The method according to claim 7, further comprising updating the estimated power and the estimated de-queuing time based on the processing completion signal.

9. The method according to claim 1, wherein the estimated power consumption is an estimated amount of power required for the memory device to perform operations in response to all commands queued in the memory command queue, and
   wherein the estimated de-queuing time is an estimated amount of time required for all the commands queued in the memory command queue to be de-queued.

10. A memory system comprising:
    a controller configured to:
       queue a plurality of commands input from an external device in a host command queue,
       identify a target command among a plurality of commands queued in the host command queue,
       control a transmission of the target command from the host command queue to a memory command queue based on an estimated power consumption of a memory device, and
       control the transmission of the target command from the host command queue to the memory command queue based on an estimated de-queuing time of the memory command queue; and
    the memory device, coupled to the controller via a channel, configured to:
       receive the de-queued target command, and
       perform an operation corresponding to the de-queued target command.

11. The memory system according to claim 10, wherein the controller comprises:
    a host interface configured to queue a plurality of commands provided from an exterior, in the host command queue;
    a memory interface configured to queue a plurality of commands to be provided to the memory device, in the memory command queue;
    a power manager configured to store the estimated power, the power limit and the estimated de-queuing time; and
    a processor configured to:
       identify the target command among the plurality of commands queued in the host command queue,
       compare an estimated power of the memory device with a power limit,
       transmit the target command from the host command queue to the memory command queue in response to the estimated power being smaller than the power limit, and de-queue the target command from the memory command queue to the memory device.

12. The memory system according to claim 11, wherein the processor in the first case transmits the target command from the host command queue to the memory command queue in response to the estimated power being larger than or equal to the power limit and the estimated de-queuing time smaller than a predetermined threshold value; and defers the transmitting the target command from the host command queue to the memory command queue in response to the estimated power being larger than or equal to the power limit and the estimated de-queuing time larger than or equal to the predetermined threshold value.

13. The memory system according to claim 12, wherein the processor in the fourth case selects at least one among tasks that do not require the memory device to consume power, in the case where the estimated de-queuing time is larger than or equal to the predetermined threshold value, and performs the at least one selected task.

14. The memory system according to claim 13, wherein the processor selects at least one task based on de-queuing time of a command which is being de-queued from the memory command queue to the memory device.

15. The memory system according to claim 12, wherein the processor controls the power manager to update the estimated power and the estimated de-queuing time.

16. The memory system according to claim 11, wherein the processor controls the memory interface to de-queue the target command to the memory device when it is a turn to process the target command among a plurality of commands queued in the memory command queue.

17. The memory system according to claim 16, wherein the memory device provides a processing completion signal for the target command, to the controller.

18. The memory system according to claim 17, wherein the power manager further updates the estimated power and the estimated de-queuing time based on the processing completion signal.

19. The memory system according to claim 11, wherein the estimated power consumption is an estimated amount of power required for a memory device to perform operations in response to all commands queued in the memory command queue, and
wherein the estimated de-queuing time is an estimated amount of time required for all the commands queued in the memory command queue to be de-queued.

20. An operating method of a controller, the operating method comprising:
queuing a plurality of commands input from an external device in a host command queue;
controlling a transmission of the plurality of commands from the host command queue to a memory command queue based on an estimated power consumption of the memory device;
performing a task based on an estimated de-queuing time of the memory command queue; and
de-queueing the commands queued in the memory command queue to control a memory device to perform operations in response to the de-queued commands,
wherein the estimated power consumption is an estimated amount of power required for the memory device to perform the operations in response to all the commands currently queued in the memory command queue, and
wherein the estimated de-queuing time is an estimated amount of time required for all the commands queued in the memory command queue to be de-queued.

* * * * *